United States Patent
Alaluf (10) Patent No.: US 7,380,242 B2
(45) Date of Patent: May 27, 2008

(54) COMPILER AND SOFTWARE PRODUCT FOR COMPILING INTERMEDIATE LANGUAGE BYTECODES INTO JAVA BYTECODES

(75) Inventor: Eyal Alaluf, Jerusalem (IL)

(73) Assignee: Mainsoft Israel Ltd., Lod (IL)

( * ) Notice: Subject to any disclaimer, the term of this patent is extended or adjusted under 35 U.S.C. 154(b) by 382 days.

(21) Appl. No.: 10/437,518

(22) Filed: May 14, 2003

(65) Prior Publication Data

US 2004/0230958 A1    Nov. 18, 2004

(51) Int. Cl.
G06F 9/45        (2006.01)

(52) U.S. Cl. ..................................... 717/148

(58) Field of Classification Search ................ 717/148
See application file for complete search history.

(56) References Cited

U.S. PATENT DOCUMENTS

| | | | |
|---|---|---|---|
| 5,668,999 A | 9/1997 | Gosling | |
| 5,740,441 A | 4/1998 | Yellin et al. | |
| 5,768,593 A | 6/1998 | Walters et al. | |
| 6,205,577 B1 | 3/2001 | Shinohara et al. | |
| 6,295,642 B1 | 9/2001 | Blandy | |
| 6,327,702 B1 | 12/2001 | Sauntry et al. | |
| 6,412,107 B1 * | 6/2002 | Cyran et al. ............... | 717/148 |
| 6,484,313 B1 | 11/2002 | Trowbridge et al. | |
| 6,810,518 B1 * | 10/2004 | Grimaud et al. ............ | 717/146 |
| 6,823,504 B1 * | 11/2004 | Sokolov ..................... | 717/136 |
| 2001/0047394 A1 * | 11/2001 | Kloba et al. ................ | 709/217 |
| 2002/0120719 A1 * | 8/2002 | Lee et al. ................... | 709/219 |
| 2003/0023958 A1 * | 1/2003 | Patel et al. ................. | 717/146 |
| 2003/0084271 A1 * | 5/2003 | Lindwer .................... | 712/209 |
| 2003/0120824 A1 * | 6/2003 | Shattuck et al. ........... | 709/313 |
| 2003/0182457 A1 * | 9/2003 | Brewin ...................... | 709/310 |
| 2004/0083467 A1 * | 4/2004 | Hanley et al. ............. | 717/148 |
| 2004/0098731 A1 * | 5/2004 | Demsey et al. ............ | 719/328 |

OTHER PUBLICATIONS

Binding et al., Generation of Java Beans to Access XML Data, 2000, IEEE, p. 143-141.*
Kazi et al., Techniques for Obtaining High Performance in Java Programs, Sep. 2000, ACM p. 213-240.*

* cited by examiner

Primary Examiner—John Chavis
(74) Attorney, Agent, or Firm—Katten Muchin Rosenman LLP (57) ABSTRACT

Compiler and software product for compiling intermediate language (IL) bytecodes, such as Microsoft IL (MSIL) instructions into Java bytecodes, are provided. The provided compiler decodes the IL instructions, generates the stack content, and produces Java bytecodes based on the stack content. Furthermore, the compiler is specially designed to allow a programmer to develop software applications using the .Net framework that could be easily executed using a Java runtime environment.

78 Claims, 9 Drawing Sheets

| Line | Stack Content |
|---|---|
| 1030 | empty |
| 1040 | empty |
| 1050 | int32 |
| 1060 | int32, int32 |
| 1070 | int32 |
| 1070 | empty |
| 1090 | |

Fig.4B

| | |
|---|---|
| 5000 | .assembly SimpleAdd {} |
| 5010 | .assembly extern mscorlib{} |
| 5020 | .class public auto ansi SimpleAdd extends [mscorlib] System.Object { |
| 5030 | .method public specialname rtspecialname instance void .ctor() cil managed { |
| 5040 | .maxstack 7 |
| 5050 | IL_0000: ldarg.0 |
| 5060 | IL_0001: call instance void [mscorlib] System.Object::.ctor() |
| 5070 | IL_0006: nop |
| 5070 | IL_0007: nop |
| 5090 | IL_0007: ret |
| 5100 | } |
| 5110 | .method public static void Main() cil managed { |
| 5120 | .entrypoint |
| 5130 | .custom instance void [mscorlib] System.STAThreadAttribute::.ctor() = ( 01 00 00 00 ) |
| 5140 | .maxstack 2 |
| 5150 | .locals init ([0] int32 i, [1] int32 j, [2] int64 k, [3] int32 l, [4] int64 m) |
| 5160 | IL_0000: nop |
| 5170 | IL_0001: ldc.i4.1 |
| 5170 | IL_0002: stloc.0 |
| 5190 | IL_0003: ldc.i4.2 |
| 5200 | IL_0004: stloc.1 |
| 5210 | IL_0005: ldc.i7    0x3 |
| 5220 | IL_000e: stloc.2 |
| 5230 | IL_000f: ldloc.0 |
| 5240 | IL_0010: ldloc.1 |
| 5250 | IL_0011: add |
| 5260 | IL_0012: stloc.3 |
| 5270 | IL_0013: ldloc.2 |
| 5270 | IL_0014: ldloc.3 |
| 5290 | IL_0015: conv.i7 |
| 5300 | IL_0016: add |
| 5310 | IL_0017: stloc.s  m |
| 5320 | IL_0019: ldsrt "Result = " |
| 5330 | IL_001e: call  void [mscorlib] System.Console::Write(string) |
| 5340 | IL_0023: nop |
| 5350 | IL_0024: ldloc.s  m |
| 5360 | IL_0026: call  void [mscorlib] System.Console::WriteLine(int64) |
| 5370 | IL_002b: nop |
| 5370 | IL_002c: nop |
| 5390 | IL_002d: ret |
| 5400 | } |
| 5410 | } |

Fig.5

| | |
|---|---|
| 6000 | *public class SimpleAdd extends java.lang.Object implements java.lang.Cloneable {* |
| 6010 | *public SimpleAdd();* |
| 6020 | *public static void original_main();* |
| 6030 | *public static void main(java.lang.String[]);* |
| 6040 | *}* |
| | |
| 6050 | *Method SimpleAdd()* |
| 6060 | *0 aload_w 0* |
| 6070 | *4 invokespecial #11 <Method java.lang.Object()>* |
| 6070 | *7 nop* |
| 6090 | *7 nop* |
| 6100 | *9 return* |
| | |
| 6110 | *Method void original_main()* |
| 6120 | *0 iconst_0* |
| 6130 | *1 istore_w 0* |
| 6140 | *5 iconst_0* |
| 6150 | *6 istore_w 1* |
| 6160 | *10 ldc2_w #12 <Long 0>* |
| 6170 | *13 lstore_w 2* |
| 6170 | *17 iconst_0* |
| 6190 | *17 istore_w 4* |
| 6200 | *22 ldc2_w #14 <Long 0>* |
| 6210 | *25 lstore_w 5* |
| 6220 | *29 nop* |
| 6230 | *30 iconst_1* |
| 6240 | *31 istore_w 0* |
| 6250 | *35 iconst_2* |
| 6260 | *36 istore_w 1* |
| 6270 | *40 ldc2_w #16 <Long 3>* |
| 6270 | *43 lstore_w 2* |
| 6290 | *47 iload_w 0* |
| 6300 | *51 iload_w 1* |
| 6310 | *55 iadd* |
| 6320 | *56 istore_w 4* |
| 6330 | *60 lload_w 2* |
| 6340 | *64 iload_w 4* |
| 6350 | *67 i2l* |
| 6360 | *69 ladd* |
| 6370 | *70 lstore_w 5* |
| 6370 | *74 ldc_w #19 <String "Result = ">* |
| 6390 | *77 invokestatic #25 <Method void Write(java.lang.String)>* |
| 6400 | *70 nop* |
| 6410 | *71 lload_w 5* |
| 6420 | *75 invokestatic #29 <Method void WriteLine(long)>* |
| 6430 | *77 nop* |
| 6440 | *79 nop* |
| 6450 | *90 return* |
| | |
| 6460 | *Method void main(java.lang.String[])* |
| 6470 | *0 invokestatic #32 <Method void original_main()>* |
| 6470 | *3 invokestatic #37 <Method int get_ExitCode()>* |
| 6490 | *6 invokestatic #44 <Method void exit(int)>* |
| 6500 | *9 return* |

Fig.6

```
7000    .method public static void main(string[] args) cil managed {
7010        .entrypoint
7020        .custom instance void [mscorlib]System.STAThreadAttribute::.ctor() = ( 01 00 00 00 )
7030        .maxstack 2
7040        .locals init (class TestExcept V_0, class [mscorlib]System.Exception V_1)
7050        IL_0000:  ldarg.0
7060        IL_0001:  newobj    instance void TestExcept::.ctor(string[])
7070        IL_0006:  stloc.0
7070          .try {
7090            .try {
7100              IL_0007:  ldloc.0
7110              IL_0007:  callvirt   instance void TestExcept::test()
7120              IL_000d:  leave.s    IL_0032
7130            } // end .try
7140            catch [mscorlib]System.Exception {
7150              IL_000f:  dup
7160              IL_0010:  call      void
[Microsoft.VisualBasic]Microsoft.VisualBasic.CompilerServices.ProjectData::SetProjectError(class
[mscorlib]System.Exception)

7170              IL_0015:  stloc.1
7170              IL_0016:  ldstr     "Caught exception"
7190              IL_001b:  call      void [mscorlib]System.Console::WriteLine(string)
7200              IL_0020:  call      void
[Microsoft.VisualBasic]Microsoft.VisualBasic.CompilerServices.ProjectData::ClearProjectError()

7210              IL_0025:  leave.s    IL_0032
7220            } // end handler
7230          } // end .try
7240          finally {
7250            IL_0027:  ldstr     "Finalized"
7260            IL_002c:  call      void [mscorlib]System.Console::WriteLine(string)
7270            IL_0031:  endfinally
7270          } // end handler
7290          IL_0032:  ret
7300    } // end of method TestExcept::main
```

Fig.7A

```
7500    .method public static void main(string[] args) cil managed {
7510        .entrypoint
7520        .custom instance void [mscorlib]System.STAThreadAttribute::.ctor() = ( 01 00 00 00 )
7530        .maxstack 2
7540        .locals init (class TestExcept V_0,
7550            class [mscorlib]System.Exception V_1,
7560            class [mscorlib]System.Exception V_2, // Added variable
7570            class [mscorlib]System.Object V_3) // Added variable
7570        IL_0000: ldarg.0
7590        IL_0001: newobj    instance void TestExcept::.ctor(string[])
7600        IL_0006: stloc.0
7610        .try {
7620          .try {
7630            IL_0007: ldloc.0
7640            IL_0007: callvirt  instance void TestExcept::test()
7650            IL_000d: *CallSub  IL_0027 // Added
7660                         leave.s   IL_0032
7670          } // end .try
7670          catch [mscorlib]System.Exception {
7690            IL_000f: dup
7700            IL_0010: call    void
[Microsoft.VisualBasic]Microsoft.VisualBasic.CompilerServices.ProjectData::SetProjectError(class
[mscorlib]System.Exception)
7710            IL_0015: stloc.1
7720            IL_0016: ldstr    "Caught exception"
7730            IL_001b: call    void [mscorlib]System.Console::WriteLine(string)
7740            IL_0020: call    void
[Microsoft.VisualBasic]Microsoft.VisualBasic.CompilerServices.ProjectData::ClearProjectError()
7750            IL_0025: *CallSub  IL_0027 // Added
7760                      leave.s   IL_0032
7770          } // end handler
7770        } // end .try
7790        catch [mscorlib]System.Exception {
7700          stloc.2
7710          *CallSub        IL_0027
7720          ldloc.2
7730          throw
7740        } // End of new code object
7750        IL_0027: stloc.3
7760                 ldstr    "Finalized"
7770        IL_002c: call    void [mscorlib]System.Console::WriteLine(string)
7770        IL_0031: *endfinally2 3
7790        IL_0032: ret
7900    } // end of method TestExcept::main
```

Fig. 7B

COMPILER AND SOFTWARE PRODUCT FOR COMPILING INTERMEDIATE LANGUAGE BYTECODES INTO JAVA BYTECODES

FIELD OF THE INVENTION

The present invention generally relates to intermediate language programming environments, and more particularly, to compilers for generation of Java bytecode instructions from intermediate language bytecodes.

BACKGROUND OF THE INVENTION

The Microsoft® .NET framework is a new platform for building integrated, service-oriented, applications to, meet the needs of today's and future Internet businesses. The .Net platform allows developers to take better advantage of technologies than any earlier Microsoft platform. Specifically, the .NET platform provides for code reuse, code specialization, resource management, multi-language development, security, deployment and administration.

A .NET application can be executed on any platform that supports the .NET common language runtime (CLR). It is further possible that a version of the CLR be built for platforms other than Windows. The .Net platform allows different programming languages to be integrated with one another. For example, it is possible to create a class in C++ that is derived from a class implemented in Visual Basic. The programming languages supported by the .Net platform includes, but are not limited to, C++ with managed extensions, C#, Visual Basic, Pascal, Cobol, Java, JScript, and many others. However, the source code written in these languages requires the CLR engine in order to execute.

Figure 1:
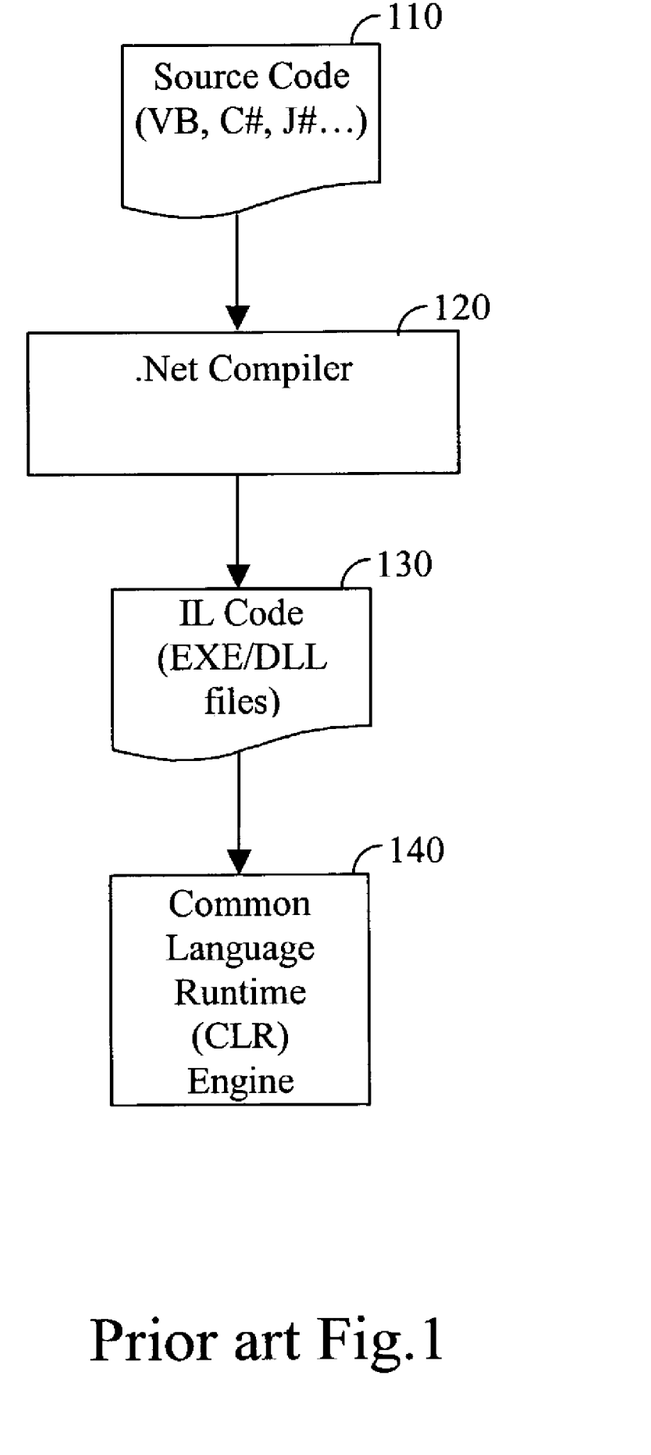
FIG. 1 is a prior art illustration of a progression of a .Net application through execution by CLR.

Reference is now made to FIG. 1, which is a prior art illustration of a progression of a .Net application through execution by a CLR engine 140. Once, the .Net source code 110 has been written in one of the programming languages mentioned above, it is first run through .Net compiler 120. .Net compiler 120 comprises a plurality of compilers, each targeted to a different language supported by the .Net platform. .Net compiler 120 generates the Microsoft intermediate language (MSIL) instructions. The MSIL instructions are arranged in assembly files 130. The MSIL includes instructions that create and initialize objects, call virtual methods on objects, raise and catch exceptions for error handling and manipulate array elements directly. The MSIL is central processing unit (CPU) independent, and as a result the MSIL instructions cannot be executed directly on a host CPU. Hence, CLR engine 140 must first compile the MSIL instructions into native CPU instructions. Generally, in order to ensure good performance, CLR engine 140 compiles the MSIL instructions as functions that are then called for execution.

Recently, the Java programming environment has gained popularity. The Java programming language is designed to be portable enough to be executed on a wide range of computers, ranging from small devices, e.g., PDA's, cell phones, and smart cards, up to supercomputers. Computer programs written in the Java programming language are compiled into Java bytecode instructions that are suitable for execution by a Java virtual machine (JVM).

Figure 2:
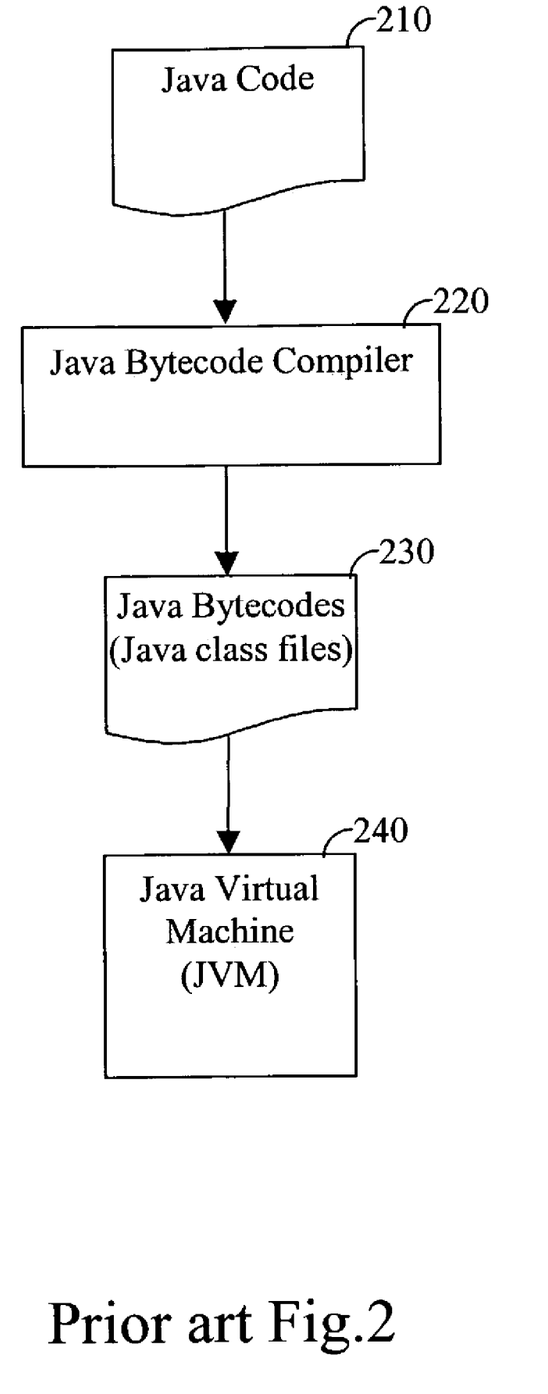
FIG. 2 is a prior art illustration of a progression of a Java application through execution by JVM.

FIG. 2 is a prior art illustration of the progression of a Java application through execution by a JVM. Java source code 210 includes a class with its associated methods written in Java. Source code 210 is then input into Java bytecode compiler 220, that compiles the source code into Java bytecodes. Java compiler 220 outputs Java class files 230 that include the bytecodes for the Java program. The Java bytecodes are virtual machine instructions that are executed by an interpreter. Typically, virtual machine instructions are generic, namely they are not designed for any specific CPU or computer architecture. The Java class file is then input into JVM 240. JVM 240 is an interpreter that decodes and executes the bytecodes of the Java class file. A conventional virtual machine's interpreter decodes and executes the Java bytecode instructions, one instruction at a time, during execution, i.e., at runtime.

It should be noted that both MSIL and Java bytecodes are stack based object-oriented languages. Stack-based languages require an efficient stack representation, fast procedure calls, and fast compilation.

It should be emphasized that Java applications can be executed either on a CLR engine or on a JVM, while .Net applications can be executed only on a CLR engine. Therefore, applications designed with the .Net platform cannot execute on a JVM. As a result, programmers cannot integrate the advantages inherent to .Net with the capabilities provided by the Java runtime environment. For example, a large number of Web applications are written in the Visual Basic programming language, however, executing those applications in a Java environment is impossible in the currently available technology.

Stack-based developments are known in the art, such as U.S. Pat. No. 5,668,999, System and Method for Pre-Verification of Stack Usage in Bytecode Program Loops, by Gosling, which features a virtual stack for temporarily storing stack information. U.S. Pat. No. 6,205,577, Interpreter for Stack-Based Languages, by Grove provides a multi-state interpreter for a stack-based programming language.

A bytecode interpreter was disclosed in U.S. Pat. No. 5,740,441, Bytecode Program Interpreter Apparatus and Method with Pre-Verification of Data Type Restrictions and Object Initialization, by Yellin, et al.

Recent compiler developments in the art include: U.S. Pat. No. 5,768,593, Dynamic Cross-Compilation System and Method, by Walters, et al;

U.S. Pat. No. 6,295,642, Method and Apparatus for Partial Just in Time Compiling in a Data Processing System, by Blandy;

U.S. Pat. No. 6,484,313, Compiling and Persisting of Intermediate Language Code, by Trowbridge, et al; and U.S. Pat. No. 6,327,1702, Generating a Compiled Language Program for an Interpretive Runtime Environment, by Sauntry, et al.

However, none of the above patents relate to a Java bytecode platform.

Therefore, there is a need for a method that overcomes the limitations of prior art by providing a compiler that decodes the MSIL instructions and produces Java bytecodes instructions.

SUMMARY OF THE INVENTION

Accordingly, it is a principal object of the present invention to overcome the limitations of prior art devices and provide a compiler that decodes the MSIL instructions and produces Java bytecodes instructions.

It is another principle object of the present invention to use the preferred compiler applications written for .Net environment for execution on a Java virtual machine (JVM).

A method is described for compiling the bytecodes of an intermediate language, by a compiler having system calls and metadata content, wherein the bytecodes are compiled into Java bytecodes for use in a Java runtime environment, the method includes a first step of generating a virtual stack content by performing a static analysis of the intermediate language bytecodes. Further steps include decoding the variable types of the intermediate language bytecodes and producing virtual stack element types, producing the Java bytecodes using said virtual stack element types and generating at least one Java class file, thereby enabling a programmer to develop software applications executable in a Java runtime environment.

The present invention provides a compiler and software product for compiling intermediate language (IL) bytecodes, such as Microsoft IL (MSIL) instructions into Java bytecodes. The provided compiler decodes the IL instructions, generates the stack content, and produces Java bytecodes based on the stack content. Furthermore, the compiler is specially designed to allow a programmer to develop software applications using the .Net framework that could be easily executed using a Java runtime environment.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIGS. 7A and 7B comprise a non-limiting example for the operation of the code simplifier procedure.

DETAILED DESCRIPTION OF THE INVENTION

The invention will now be described in connection with certain preferred embodiments with reference to the following illustrative figures so that it may be more fully understood. References to like numbers indicate like components in all of the figures.

The present invention provides a compiler and a software product for compiling Microsoft intermediate language (MSIL) instructions into Java bytecodes. The provided compiler allows a programmer to develop applications using the .Net framework and to execute them on a Java runtime environment. In order to perform the compilation the following steps have to take place: analyzing the MSIL instructions, generating the stack content based on the MSIL instructions, and converting the stack content to Java bytecode instructions. The compilation process is described below in greater detail.

Figure 3:
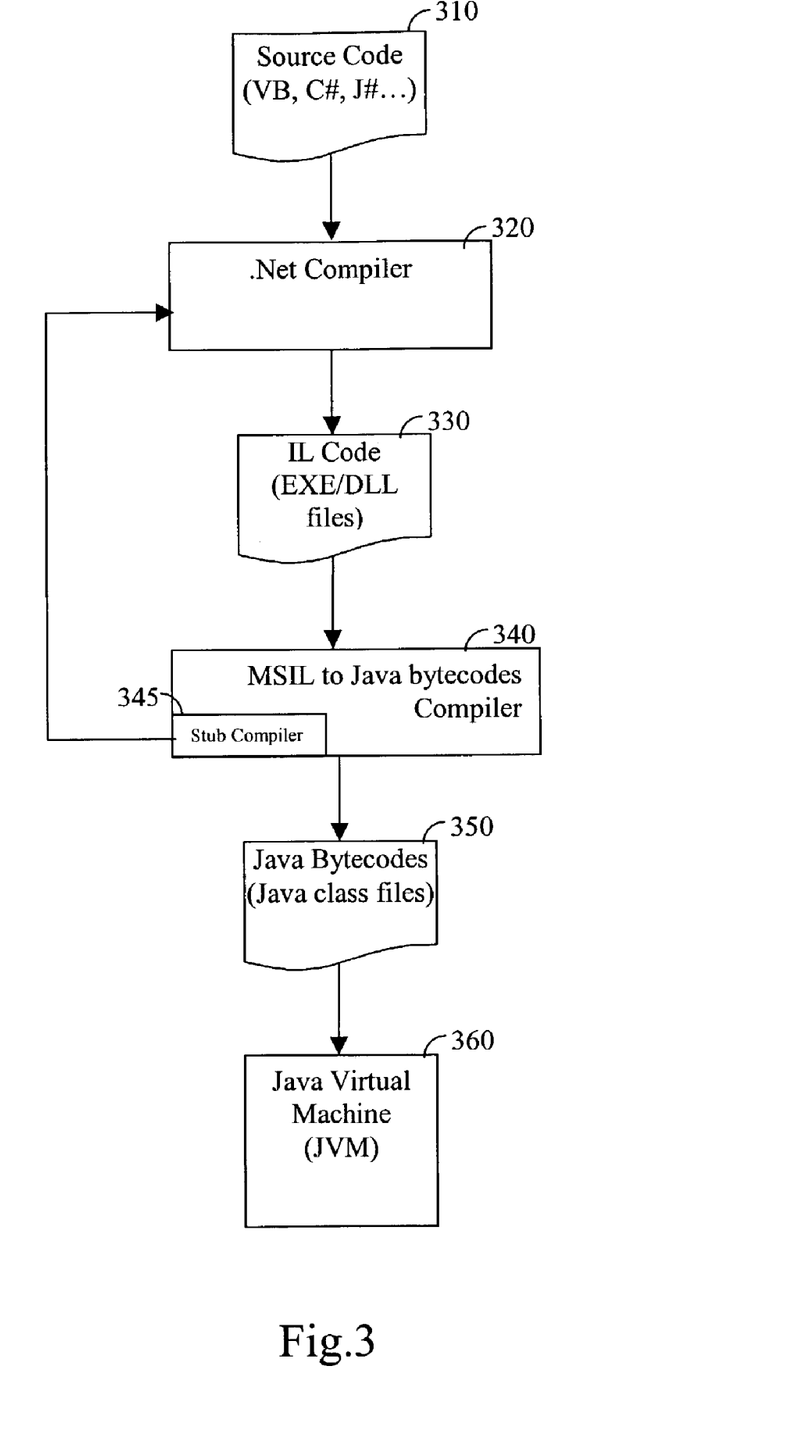
FIG. 3 is an illustration of a progression of a .Net application through execution by JVM, in accordance with one embodiment of the present invention.

Reference is now made to FIG. 3, which illustrates a progression of a .Net application through execution by Java virtual machine (JVM) 360, in accordance with one embodiment of the present invention. Initially, a software programmer creates source code 310 using a .Net development tool. A development tool allows the programmer to both develop the source code and create the build files necessary for the final compilation of the source code into its respective assembly file. Build files contain information about the files used in the compilation process and their interaction therein. After the development stage, source code 310 is compiled into an MSIL assembly file using .Net compiler 320. .Net compiler 320 consists of several compilers each targeted to a different programming language supported by the .Net platform. Subsequently, .Net compiler 320 generates the assembly files 330, which are functional building blocks of the application. Assembly files 330 include the MSIL instructions together with metadata files to be used by exemplary common language runtime (CLR) engine 140.

The metadata files are used to locate and load class types in the file, lay out object instances in memory, resolve method invocations, field references and for other activities. In order to allow the execution of MSIL instructions on JVM 360, compiler 340 compiles the MSIL instructions into Java bytecodes. Compiler 340 outputs the Java class files 350. The Java bytecodes are virtual machine instructions that can be executed by JVM 360. Compiler 340 is one embodiment of the present invention and is described in greater detail below.

Compiler 340 generates Java bytecodes that can be executed in conjunction with any Java runtime environment, e.g. J2EE, J2SE, etc. This ability is achieved using a stub compiler 345 provided by the present invention. Stub compiler 345 converts a Java runtime component selected by the programmer into a .Net assembly file with the same classes, methods and fields of the selected Java component. Then, .Net compiler 320 can compile source code 310 that uses the selected Java runtime component's classes, methods, and the .Net assembly file. As Java class files 350 are being created, compiler 340 links them to the selected Java runtime environment. That is, the generated class file 350 can be executed in conjunction with the selected Java runtime component by JVM 360.

Figure 4A:
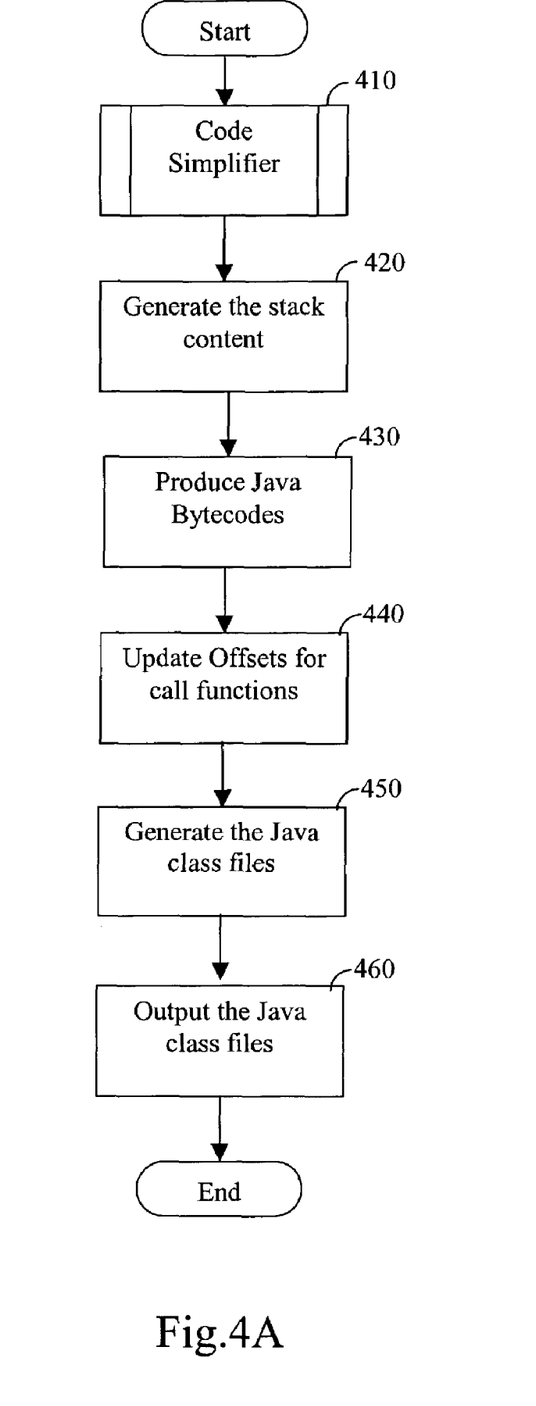
FIG. 4A is a flowchart of an exemplary process for compiling MSIL instructions into Java bytecodes, in accordance with one embodiment of the present invention.

FIG. 4A is a flowchart of an exemplary process for compiling MSIL instructions into Java bytecodes, in accordance with one embodiment of the present invention. The process begins when compiler 340 receives assembly files 330 created by .Net compiler 320 as its input, described in FIG. 3.

At step 410 of FIG. 4A, the MSIL instructions are analyzed by means of a code simplifier procedure. The code simplifier detects patterns of MSIL instructions and replaces each detected pattern with a less complicated code. These patterns may be any sequence of MSIL instructions that perform a particular action, for instance, raising or catching exceptions and mechanisms that are not defined in the Java language. The code simplifier uses standard MSIL instructions as well as pseudo MSIL instructions to generate the new code. The pseudo MSIL instructions are exclusive instructions that can be decoded only by compiler 340. The code simplifier procedure simplifies the compilation process in later stages. In some embodiments, the code simplifier may be used to optimize the generated Java bytecodes. A detailed example describing the operation of the code simplifier is provided below.

At step 420, compiler 340 performs static analysis of the MSIL instructions and generates virtual stack content. Compiler 340 uses a virtual stack for temporarily storing stack information, which parallels the typical stack operations required during the execution a bytecode program. To be precise, compiler 340 determines the type of each stack element and its order in the stack. There are only four different stack element types 32 bit integer, 64 bit integer, floating number, and object reference, whereas the common variable types in the MSIL include, but are not limited to, byte, 32 bits, or 64 bits, representing an integer, single precision number, double precision number, Boolean, character (char), decimal, string, pointer, array and others. For example, the following assembly program defines two local variable "V_0" and "V_1" as a 32 bit integer, multiplies them and prints the results.

```
1000    .method static public void main( ) il managed {
1010    .entrypoint
1020    .maxstack 2
1030    .locals(int32 V_0, int32 V_1)
1040    ldloc.0
1050    ldloc.1
1060    mul
1070    call void [mscorlib]System.Console::WriteLine(int32)
1070    ret
1090    }
```

The "maxstack" declaration in line 1020 is used to state the maximum number of variables needed on the stack at any given time. In line 1030 two local variables "V_0" and "V_1" are declared as 32 bit integers and in lines 1040 and 1050 they are pushed on the stack. The "mul" instruction in line 1060 pops the variables "V_0" and "V_1" from the stack, multiplies them, and pushes the result back on the stack. The print system call in line 1070 pops the result, which is the only variable on the stack, and prints its value.

Figure 4B:
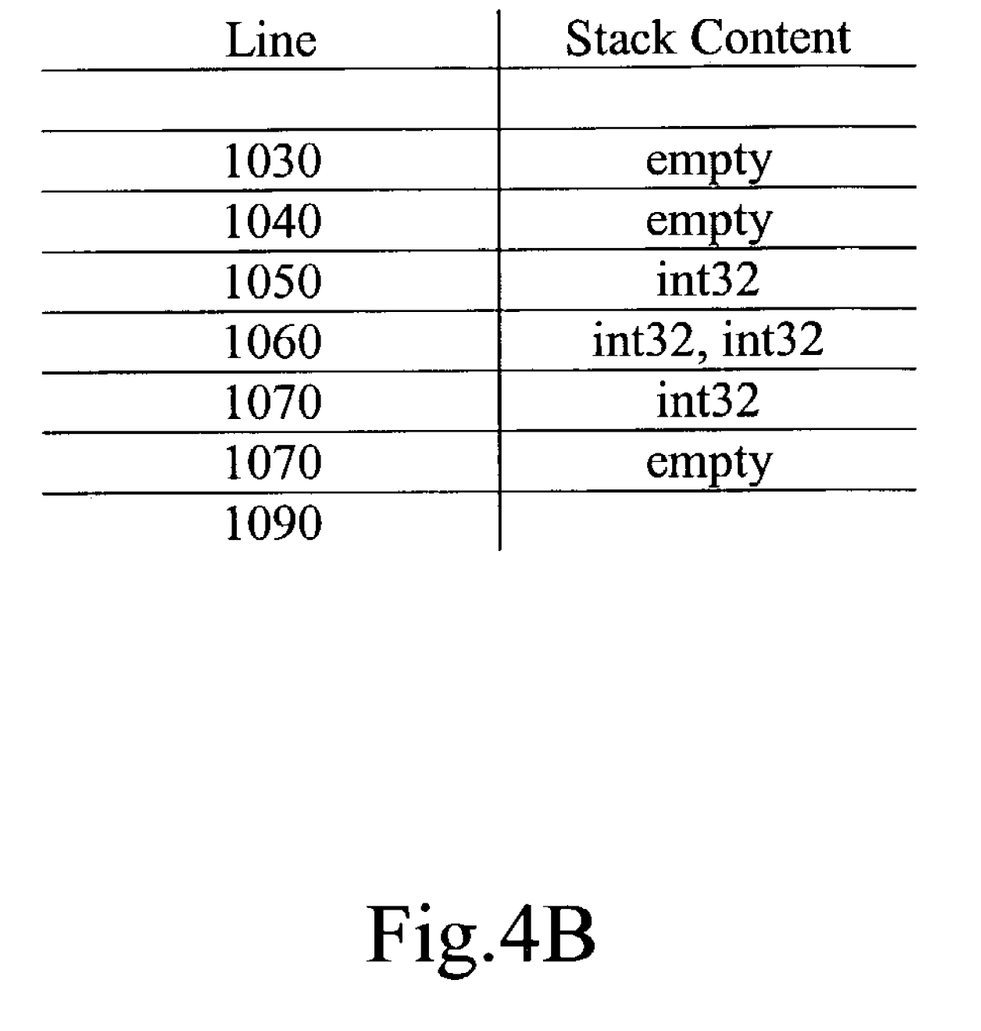
FIG. 4B is a diagram showing the content of an exemplary virtual stack.

FIG. 4B shows the content of the virtual stack prior to the execution of each instruction. As can be seen in FIG. 4B the stack content includes only the types of the local variables, but neither the variable names nor their values. The stack content is deterministic, i.e., even if there are two ways to get to a particular instruction, e.g., using the branch opcode, the stack of types at the instruction in both paths must be identical. That ensures a well-defined production of the Java bytecodes.

At step 430, compiler 340 examines the stack content and produces the respective Java bytecodes. The Java bytecodes production includes:

converting MSIL instructions to Java bytecode instructions according to the virtual stack content, converting the MSIL system calls to Java system calls;

changing MSIL variable types to Java variable types;

handling attributes not supported by the Java language, e.g., passing parameters by reference; and other tasks required to provide the Java bytecodes.

Furthermore, compiler 340 compiles the metadata in the assembly files into Java bytecodes. There are various approaches for performing code conversion, generally referred to as code inline techniques. One of the approaches for performing code inline, disclosed by the present invention, is the use of compiler-implemented classes. The compiler-implemented classes are external static classes that include Java bytecodes for frequently used MSIL instructions or methods. Instead of converting such instructions or methods to Java bytecodes in the current assembly file, compiler 340 inserts a single Java bytecode calling for a particular compiler-implemented class. The use of compiler-implemented classes reduces the code size and simplifies the resultant Java class files 350. Because there are various ways for performing the code conversion, the generated Java code is not deterministic. However, since the generated Java bytecodes are derived from the stack content it ensures that the generated code is well defined.

At step 440, compiler 340 updates the offsets of the jump calls. At step 450, compiler 340 generates the resultant Java class files 350. Typically, a Java class file includes various components associated with the class. These components may be, for example, methods and/or interfaces associated with the class. The production of Java class files 350 includes generating a single Java class for each MSIL class in assembly files 330, mapping method and variable names and updating reference fields. At step 460, compiler 340 outputs the resultant Java class files 350.

Figure 5:
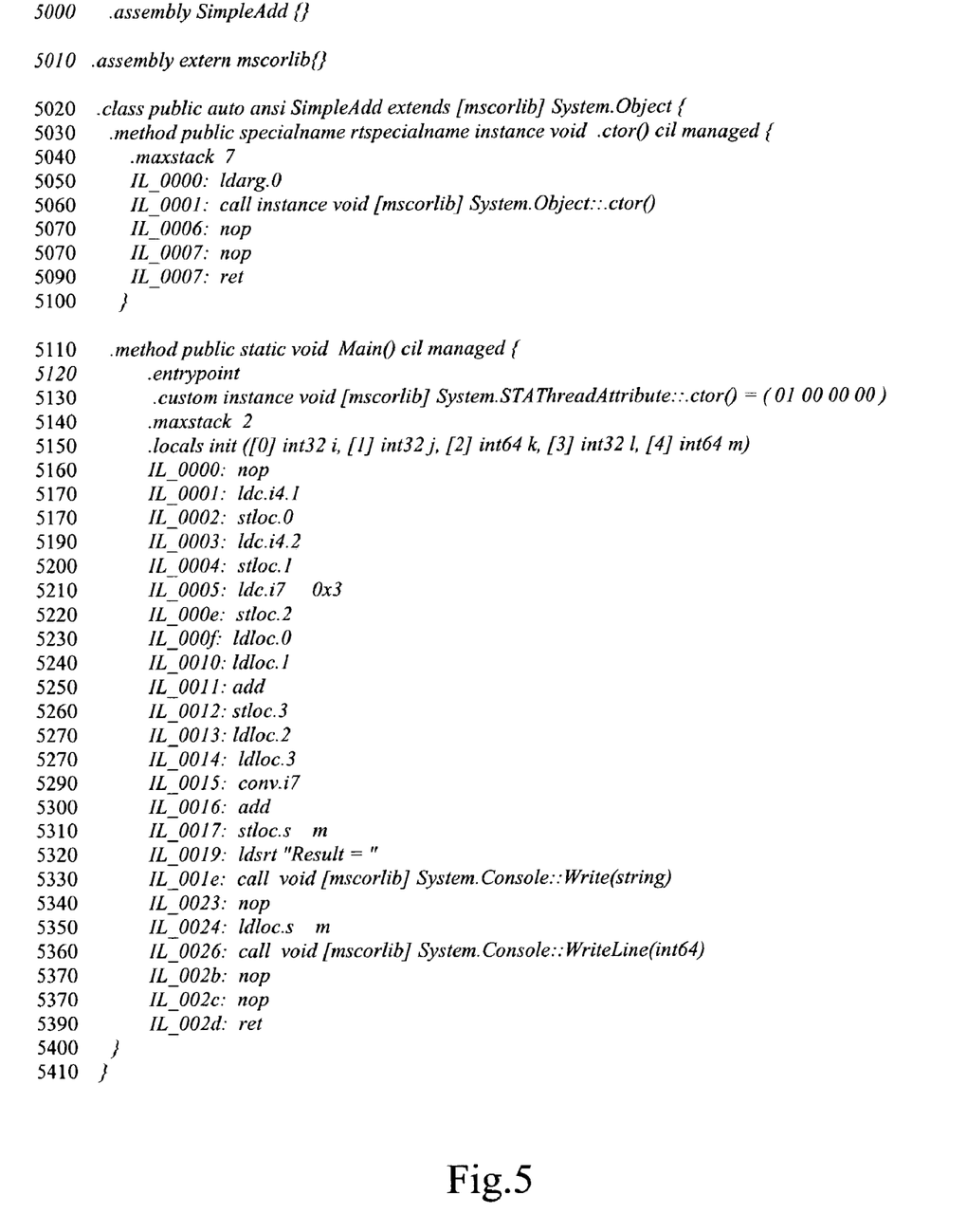
FIG. 5 is a non-limiting example of an assembly file generated by a .Net compiler.

FIG. 5 is a non-limiting example of an assembly file generated by a .Net compiler 320. FIG. 5 applies to the entire flowchart of FIG. 4A. The following discussion explains the operation of compiler 340 in respect of this example that shows the compilation of a simple MSIL program. The exemplary program of FIG. 5 adds three numbers and prints the result.

The following is a line-by-line analysis of the "Main" method belonging to the "SimpleAdd" class. Instruction 5150 is a declaration of five local variables "i", "j", "k", "l", and "m." The local variables "i", "j", and "l" are 32 bit integers, while the local variables "k" and "m" are 64 bit integers. In line 5170 the number '1' is pushed to the stack, while in line 5170 the number '1' is popped and stored in the local variable "i." The same is true for the local variables "j" and "k" in lines 5190 through 5220. In lines 5230 and 5240, the local variables "i" and "j" are pushed on the stack. In line 5250 an add operation is performed between the variables "i" and "j", and the result is stored in local variable "k." In line 5300 an add operation is performed between the variables "l" and "k," and the result is stored in local variable "m." It should be noted that the add operation in line 5250 is performed between 32 bit integers, while the add operation in line 5300 is performed between 64 bit integers. Though the MSIL does not include different add operations, as opposed to those defined in Java bytecode specification. Therefore, compiler 340 should handle this difference. In line 5320 the string "Result= " is pushed on the stack. The output of the system, i.e. "Result=6," is printed using the system calls in lines 5220 and 5360.

It should be noted that the assembly file shown above is not described in its entirety, so that clarity may be maintained and further includes classes which are not required for the explanation of this example. The exemplary assembly code shown above was created using the "ildasm" compiler.

Based on the assembly file, compiler 340 generates the stack content and produces the Java bytecodes, i.e., Java class file, using the process described above in greater detail. For this example, the generated Java class file is shown in FIG. 6.

Figure 6:
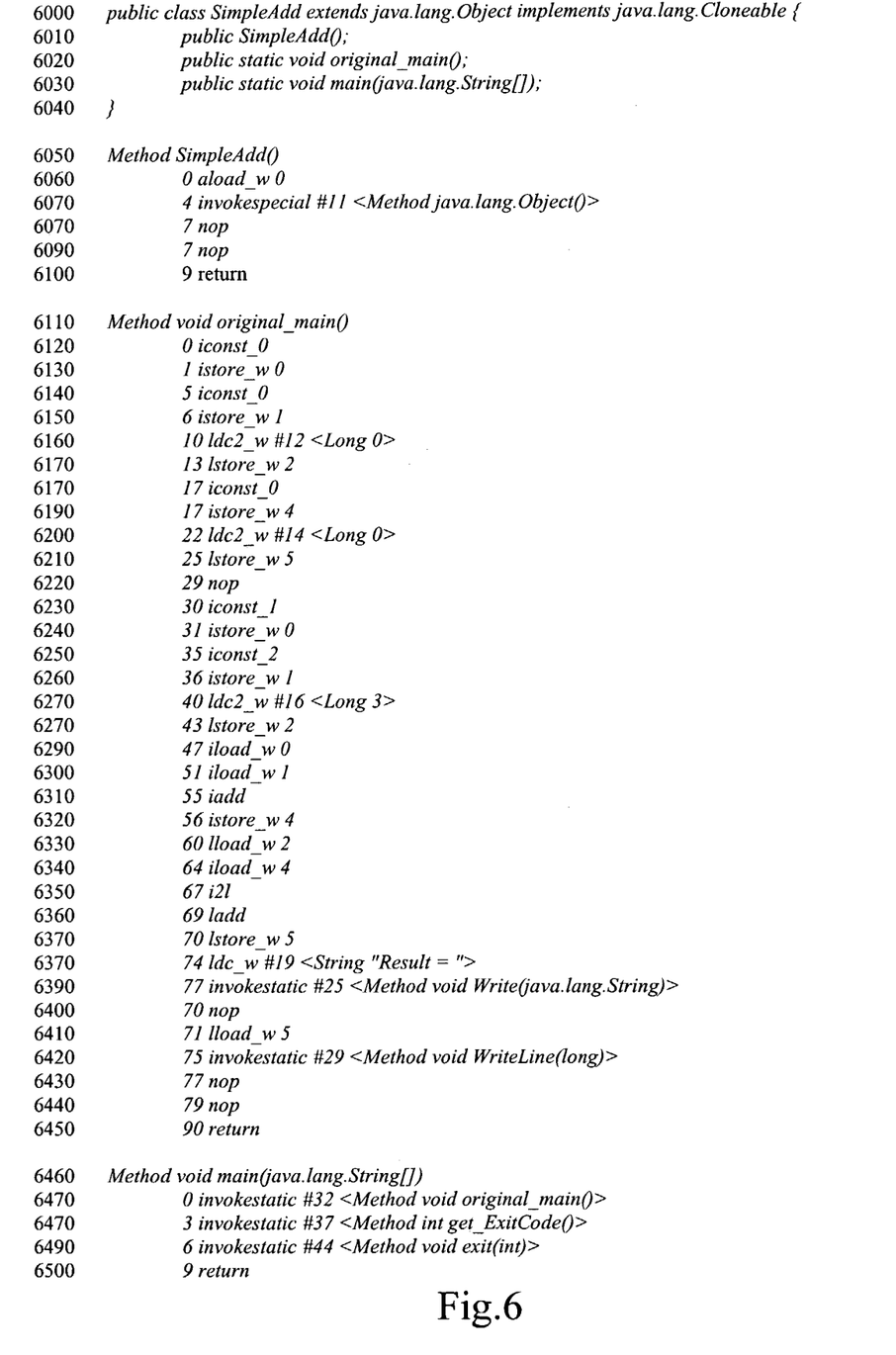
FIG. 6 is a non-limiting example of Java class file generated by the provided compiler.

FIG. 6 is a non-limiting example of Java class file generated by the provided compiler, which is a line-by-line analysis of the "original_main" method derived from MSIL bytecodes of the "Main" method described FIG. 5 above. FIG. 6 applies to the block 410 of the flowchart of FIG. 4A. In lines 6120 through 6210 the local variables "w 0", "w 1", "w 2", "w 4", and "w 5," corresponding to variables "i", "j", "k", "l", and "m" respectively, are declared and set to zero. The variable type of the local variables "w 2" and "w 5" is "long," since originally these variables were declared as 64 bit integers. In lines 6230 through "43" the local variables "w 0", "w 1", and "w 2" are set to the values 1, 2, and 3 respectively. In line 6310, an add operation is performed between the two variables "w 0" and "w 1." Compiler 340 converts the MSIL instruction "add" to the Java bytecode instruction "iadd," i.e., add two integers, since "w 0" and "w 1" are both integers. In line 6320, the result is saved to the local variable "w 4."

In line 6360, an add operation is performed between the two variables "w 2" and "w 4." Compiler 340 converts the MSIL instruction "add" to the Java bytecode instruction "ladd," i.e., add between long numbers, since "w 2" and "w 4" are both long numbers. In line 6370, the result is saved in the local variable "w 4." As can be understood from this example, the Java bytecodes include different types of add operations, each operation uses different variable types for summing. As mentioned above, the MSIL includes a single add operation. Therefore, compiler 340 converts the add operations in lines 5250 and 5300 to "iadd and "ladd" operations respectively. This is performed after checking the type of the arguments by using the generated stack content involved with each of the add operations. This example emphasizes the advantages in using the stack content for generating the Java bytecode.

Figure 7A:
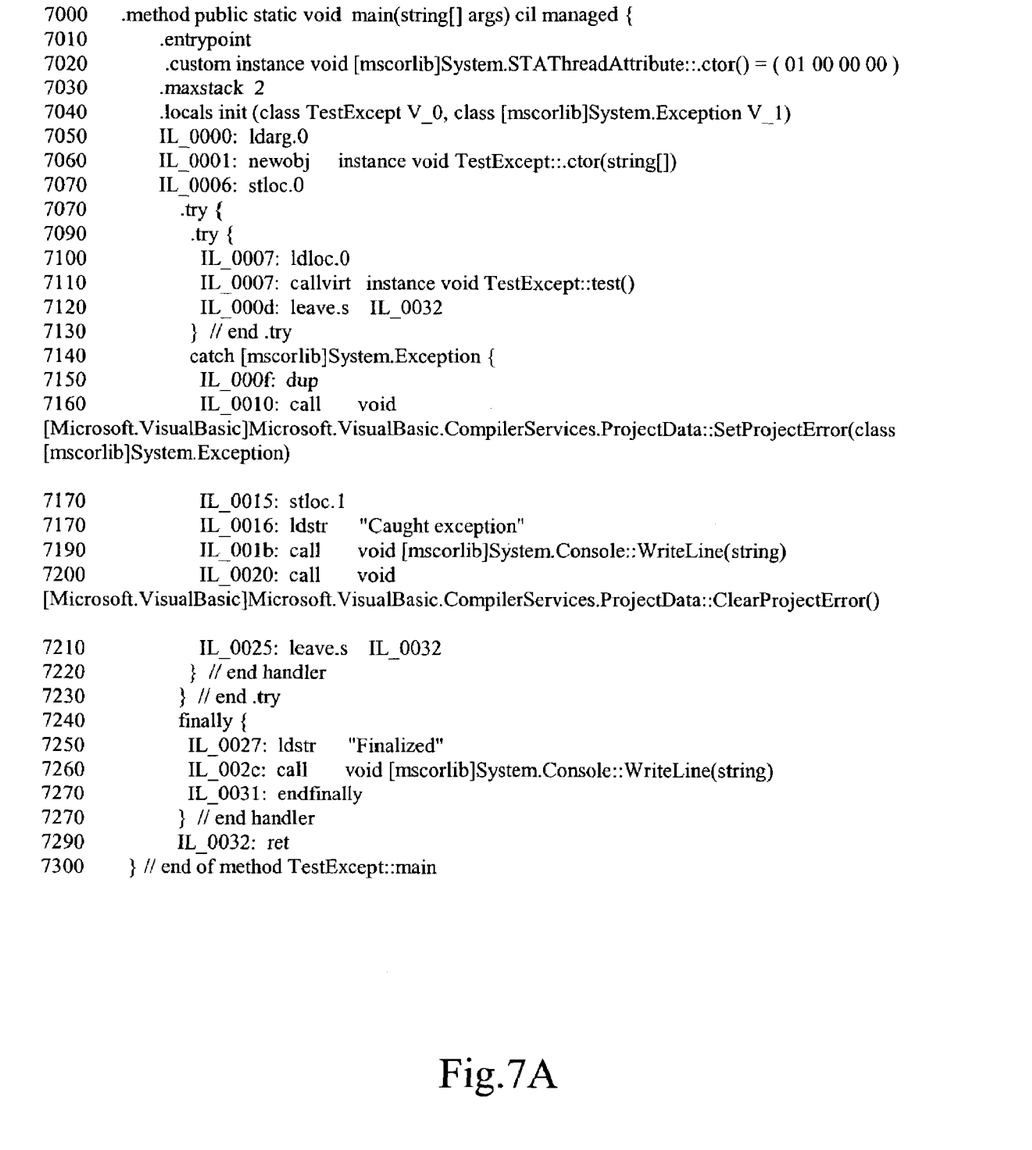

FIGS. 7A and 7B are a non-limiting example for the operation of code simplifier procedure 410. FIG. 7A shows an exception handler written in MSIL, while FIG. 7B shows the exception handler code as produced by code simplifier 410. FIG. 7A is the code before simplification and FIG. 7B is the same code after simplification An exception is an event that occurs during the execution of a program that disrupts the normal flow of instructions. When such an error occurs, the method creates an exception object and hands it off to the runtime system. The exception object contains information about the exception, including its type and the state of the program when the error occurred. The runtime system is then responsible for finding some code to handle the error. An exception handler includes three blocks: try, e.g., lines 7090 through 7130; catch, e.g., lines 7140 through 7220; and finally, e.g., lines 7250 through 7270. The try block includes the statements themselves, e.g., the statement in line 7110 that might throw an exception. If an exception occurs within the try statement, that exception is handled by the appropriate exception handle.

The catch block associates the exception handler with a try statement. The finally block provides a mechanism for cleaning up the state of the method before allowing control to be passed to a different part of the program. The runtime system always executes the statements within the finally block, regardless of what happens within the try block, as exemplified by lines 7070 through 7230. The finally statement is not defined in the Java bytecodes, hence compiler 340 should changed the MSIL program shown in FIG. 7A in such a manner that the runtime system will continue to execute the finally block.

For that purpose, compiler 340, using code simplifier 410, adds a new code block in lines 7790 through 7740, defines two new local variables "V_2" and "V_3" and uses two pseudo-MSIL instructions "endfinally2" and "CallSub." The "CallSub" is used to jump to the new finally block in lines 7750 through 7770. The new finally block includes two new instructions in lines 7750 and 7770. In line 7750 the return address is saved in local variable "V_3", while in line 7770 the "endfinally2" instruction loads the return address from the local variable "V_3" and returns. The use of the local variable "V_3" and the "endfinally2" instruction helps to track the return addresses, and to perform exactly the same actions usually taken by the "finally" and "endfinally" instructions.

The code simplifier enables to resolve and break dependencies at the MSIL level, and therefore simplifies the compilation in the later stages.

The present invention teaches how to compile MSIL bytecodes to Java bytecodes, however, a person skilled in the art could easily modify compiler 340 to handle other stack based intermediate languages.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A method for compiling the bytecodes of a first intermediate language to a second intermediate language, by a compiler having system calls and metadata content, wherein said second intermediate language is Java bytecodes for use in a Java runtime environment, said method comprising:
   generating a virtual stack content by performing a static analysis of the first intermediate language bytecodes;
   decoding the variable types of the first intermediate language bytecodes and producing virtual stack element types; and
   producing the Java bytecodes using said virtual stack element types and the respective first intermediate language bytecodes.

2. The method of claim 1, further comprising the step of simplifying the bytecodes of the first intermediate language prior to generating a virtual stack content.

3. The method of claim 2, wherein said simplifying the first intermediate language bytecodes comprises at least replacing the intermediate language bytecodes with at least one pseudo intermediate language instruction.

4. The method of claim 3, wherein decoding of said at least one pseudo intermediate language instruction is unique to the compiler.

5. The method of claim 1, wherein said second intermediate language is Microsoft intermediate language (MSIL™).

6. The method of claim 5, wherein said MSIL™ is generated using another compiler.

7. The method of claim 6, wherein said other compiler is a .Net compiler.

8. The method of claim 7, wherein said .Net compiler is capable of compiling at least one of the following programming languages: C++ with managed extensions; C#; Visual Basic; Pascal; Cobol; Java; and Jscript.

9. The method of claim 1, wherein said software applications are at least .Net applications.

10. The method of claim 1, wherein said virtual stack element types comprise at least one of: 32 bit integer; 64 bit integer; object reference; and floating number.

11. The method of claim 1, wherein said variable types comprise at least one of: byte; 32 bit integer; 64 bit integer; single precision number; double precision number; Boolean character (char); decimal; string 16 bit integer; 8 bit integer; unsigned 16 bit integer; unsigned 32 bit integer; unsigned 64 bit integer; and object reference.

12. The method of claim 1, wherein producing Java bytecodes comprises at least: convening the intermediate language system calls to Java system calls, changing said variable types of the intermediate language bytecodes to Java variable types and creating the Java bytecodes using said virtual stack content.

13. The method of claim 1, wherein producing Java: bytecodes further comprises convening the metadata content to the Java bytecodes.

14. The method of claim 1, wherein producing said Java bytecodes is performed using said at least compiler-implemented classes.

15. The method of claim 14, wherein said at least compiler-implemented classes comprise static Java class files programmed to convert frequently used intermediate language bytecodes.

16. The method of claim 1, wherein said generating a; least one Java class file comprises at least: mapping method names; mapping variable names; and updating reference fields.

17. The method of claim 1, wherein said generating at least one Java class file comprises outputting a single class file for each intermediate language class.

18. The method of claim 1, wherein said compiling is operative to handle attributes unsupported by the Java language.

19. The method of claim 1, wherein the Java bytecodes can be executed an any Java virtual machine.

20. The method of claim 1, wherein the Java bytecodes can operate in conjunction with any Java runtime environment.

21. The method of claim 20, wherein said Java runtime environment comprises at least Java to enterprise edition (J2EE) platform and Java to standard edition (J2SE) platform.

22. A computer storage unit comprising computer executable code having system calls and metadata content, and capable of decoding intermediate language bytecodes and producing Java class files for use in a Java runtime environment, wherein executing the code comprises: generating a virtual stack content by performing a static analysis of the intermediate language bytecodes; decoding the variable types of the intermediate language bytecodes and producing virtual stack element types; producing the Java bytecodes using said virtual stack element types; and, generating at least one Java class file, thereby enabling a programmer to develop software applications executable in the Java runtime environment.

23. The computer storage unit of claim 22, the computer executable code further comprising the step of simplifying the intermediate language bytecodes prior to generating a virtual stack content.

24. The computer storage unit of claim 23, wherein said simplifying the intermediate language bytecodes comprises at least replacing the intermediate language bytecodes with at least one pseudo intermediate language instruction.

25. The computer storage unit of claim 24, wherein decoding of said at least one pseudo intermediate language instruction is unique to the code.

26. The computer storage unit of claim 22, wherein the intermediate language comprises another intermediate language.

27. The computer storage unit of claim 26, wherein the intermediate language is Microsoft intermediate language (MSIL™).

28. The computer storage unit of claim 22, wherein said MSIL™ is generated using another compiler.

29. The computer storage unit of claim 22, wherein the software applications are at least .Net applications.

30. The computer storage unit of claim 29, wherein said another compiler is a .Net compiler.

31. The computer storage unit of claim 30, wherein said .Net compiler is capable of compiling at least one of the following programming languages: C++ with managed extensions; C#(C Sharp); Visual Basic; Pascal; Cobol; and Jscript.

32. The computer storage unit of claim 22, wherein said virtual stack element types comprise at least one of: 32 bit integer; 64 bit integer; object reference; and floating number.

33. The computer storage unit of claim 22, wherein said variable types comprise at least one of: byte; 32 bit integer; 64 bit integer; single precision number; double precision number; Boolean; character (char); decimal; string; 16 bit integer; 8 bit integer; unsigned 16 bit integer; unsigned 32 bit integer; unsigned 64 bit integer; and object reference.

34. The computer storage unit of claim 22, wherein producing Java bytecodes comprises at least: converting the intermediate language system calls to Java system calls, changing said variable types of the intermediate language bytecodes to Java variable types and creating the Java bytecodes using said virtual stack content.

35. The computer storage unit of claim 22, wherein producing Java bytecodes further comprises converting the metadata content to the Java bytecodes.

36. The computer storage unit of claim 22, wherein producing said Java bytecodes is performed using at least compiler-implemented classes.

37. The computer storage unit of claim 36, wherein said compiler-implemented classes are static Java class files programmed to convert frequently used intermediate language bytecodes.

38. The computer storage unit of claim 22, wherein generating said at least one Java class file comprises outputting a single class file for each intermediate language class.

39. The computer storage unit of claim 22, wherein said generating Java class file comprises at least: mapping method names; mapping variable names; and updating reference fields.

40. The computer storage unit of claim 22, wherein said code is operative to handle attributes unsupported by the Java language.

41. The computer storage unit of claim 22, wherein said Java class file can be executed on any Java virtual machine.

42. The computer storage unit of claim 22, wherein the Java bytecodes can operate in conjunction with any Java runtime environment.

43. The computer storage unit of claim 42, wherein said Java runtime environment comprises at least Java to enterprise edition (J2EE) platform and Java to standard edition (J2SE) platform.

44. A computer storage medium having recorded thereon a compiler having system calls and metadata content, and capable of compiling intermediate language bytecodes into Java bytecodes for use in a Java runtime environment, said compiler comprising: means for generating a virtual stack content by performing a static analysis of the intermediate language bytecodes; means for decoding the variable types of the intermediate language bytecodes and producing virtual stack element types; means for producing the Java bytecodes using said stack virtual stack element types; and means for generating at least one Java class file, thereby enabling a programmer to develop software applications executable in a Java runtime environment.

45. The computer storage medium of claim 44, the compiler further comprising means for simplifying the bytecodes of the intermediate language prior to generating a virtual stack content.

46. The computer storage medium of claim 45, wherein said simplifying of the intermediate language bytecodes comprises at least replacing the intermediate language bytecodes with at least one pseudo intermediate language instruction.

47. The computer storage medium of claim 45, wherein said MSIL™ is generated using another compiler.

48. The computer storage medium of claim 44, wherein the intermediate language comprises another intermediate language.

49. The computer storage medium of claim 48, wherein said other compiler is a .Net compiler.

50. The computer storage medium of claim 44, wherein said another intermediate language is Microsoft intermediate language (MSIL™).

51. The computer storage medium of claim 50, wherein said .Net compiler is capable of compiling at least one of the following programming languages: C++ with managed extensions; C#; Visual Basic; Pascal; Cobol; Java; and Jscript.

52. The computer storage medium of claim 44, wherein said software applications are at least .Net applications.

53. The computer storage medium of claim 44 wherein said virtual stack element types comprise at least one of: 32 bit integer; 64 bit integer; object reference; floating number.

54. The computer storage medium of claim 44, wherein said variable type comprises at least one of: byte; 32 bit integer; 64 bit integer; single precision number; double precision number; Boolean; character (char); decimal; string; and pointer.

55. The computer storage medium of claim 54, wherein said at least compiler-implemented classes comprise static Java class files programmed to convert frequently used intermediate language bytecodes.

56. The computer storage medium of claim 44, wherein said producing Java bytecodes comprises at least: converting the intermediate language system calls to Java system calls, changing said variable types of the intermediate language to Java variable types and creating the Java bytecodes using said virtual stack content.

57. The computer storage medium of claim 44, wherein producing Java bytecodes further comprises converting the metadata content to the Java bytecodes.

58. The computer storage medium of claim 44, wherein producing said Java bytecodes is performed using said at least compiler-implemented classes.

59. The computer storage medium of claim 44, wherein said generating at least one Java class file comprises outputting a single class file for each intermediate language class.

60. The computer storage medium of claim 44, wherein said generating at least one Java class file comprises at least: mapping method names, mapping variable names, updating reference fields.

61. The computer storage medium of claim 60, wherein said Java runtime environment comprises at least Java to enterprise edition (J2EE) platform and Java to standard edition (J2SE) platform.

62. The computer storage medium of claim 44, wherein said compiler is operative to handle attributes unsupported by the Java language.

63. The computer storage medium of claim 44, wherein the Java bytecodes can be executed on any Java virtual machine.

64. The computer storage medium of claim 63, wherein decoding of said at least one pseudo intermediate language bytecode is unique to the compiler.

65. The computer storage medium of claim 44, wherein the Java bytecodes can operate in conjunction with any Java runtime environment.

66. A computer storage unit comprising computer executable code for executing .Net applications on a Java virtual machine (JVM) having a .Net compiler and a Java runtime environment, comprising the steps of: generating bytecodes in an intermediate language using the .Net compiler; compiling said intermediate language bytecodes into Java bytecodes; and executing said Java bytecodes on the JVM, thereby enabling a programmer to develop .Net applications executable in the Java runtime environment.

67. The computer storage unit of claim 66, wherein said intermediate language is at least a Microsoft intermediate language (MSIL™).

68. The computer storage unit of claim 66, wherein said .Net applications are written using at least one of the following programming languages: C++ with managed extensions; C#; Visual Basic; Pascal; Cobol; Java; and Jscript.

69. The computer storage unit of claim 66, wherein compiling intermediate language into Java bytecodes further comprises:
generating a virtual stack content by performing a static analysis of said intermediate language bytecodes;
decoding the variable types of said intermediate language bytecodes and producing stack element types;
producing said Java bytecodes using said stack virtual stack element types; and, generating at least one Java class file.

70. The computer storage unit of claim 66, wherein compiling said intermediate language bytecodes further comprises the step of simplifying said intermediate language bytecodes prior to generating a virtual stack content.

71. The computer storage unit of claim 69, wherein said generating Java class file comprises at least mapping method names, mapping variable names and updating reference fields.

72. The computer storage unit of claim 71, wherein said any Java runtime environment comprises at least Java to platform enterprise edition (J2EE) and Java to platform standard edition (J2SE).

73. The computer storage unit of claim 69, wherein generating said at least one Java class file comprises outputting a single class file for each intermediate language class.

74. The computer storage unit of claim 69, wherein producing Java bytecodes comprises at least: converting intermediate language system calls to Java system calls, changing said variable types of the intermediate language to Java variable types and creating the Java bytecodes using said virtual stack content.

75. The computer storage unit of claim 69, wherein the generated Java bytecodes can operate in conjunction with any Java runtime environment.

76. A computer system comprising at least a central processing unit (CPU); a memory; means for inputting at least one .Net application; a .Net compiler; and a computer executable code for executing said at least one .Net application on a Java virtual machine (JVM), wherein said computer system utilizes said processing unit to execute the steps of:
    generating intermediate language bytecodes using said .Net compiler;
    compiling said intermediate language into Java bytecodes; and
    executing said Java bytecodes on said JVM.

77. The computer system of claim 76, wherein said intermediate language is at least a Microsoft intermediate language (MSIL™).

78. The computer system of claim 76, wherein compiling said intermediate language into Java bytecodes further comprises: generating a virtual stack content by performing a static analysis of said intermediate language bytecodes; decoding the variable types of said intermediate language bytecodes and producing stack element types; producing said Java bytecodes using said stack element types; and, p1 generating at least one Java class file.

* * * * *